UNITED STATES PATENT OFFICE.

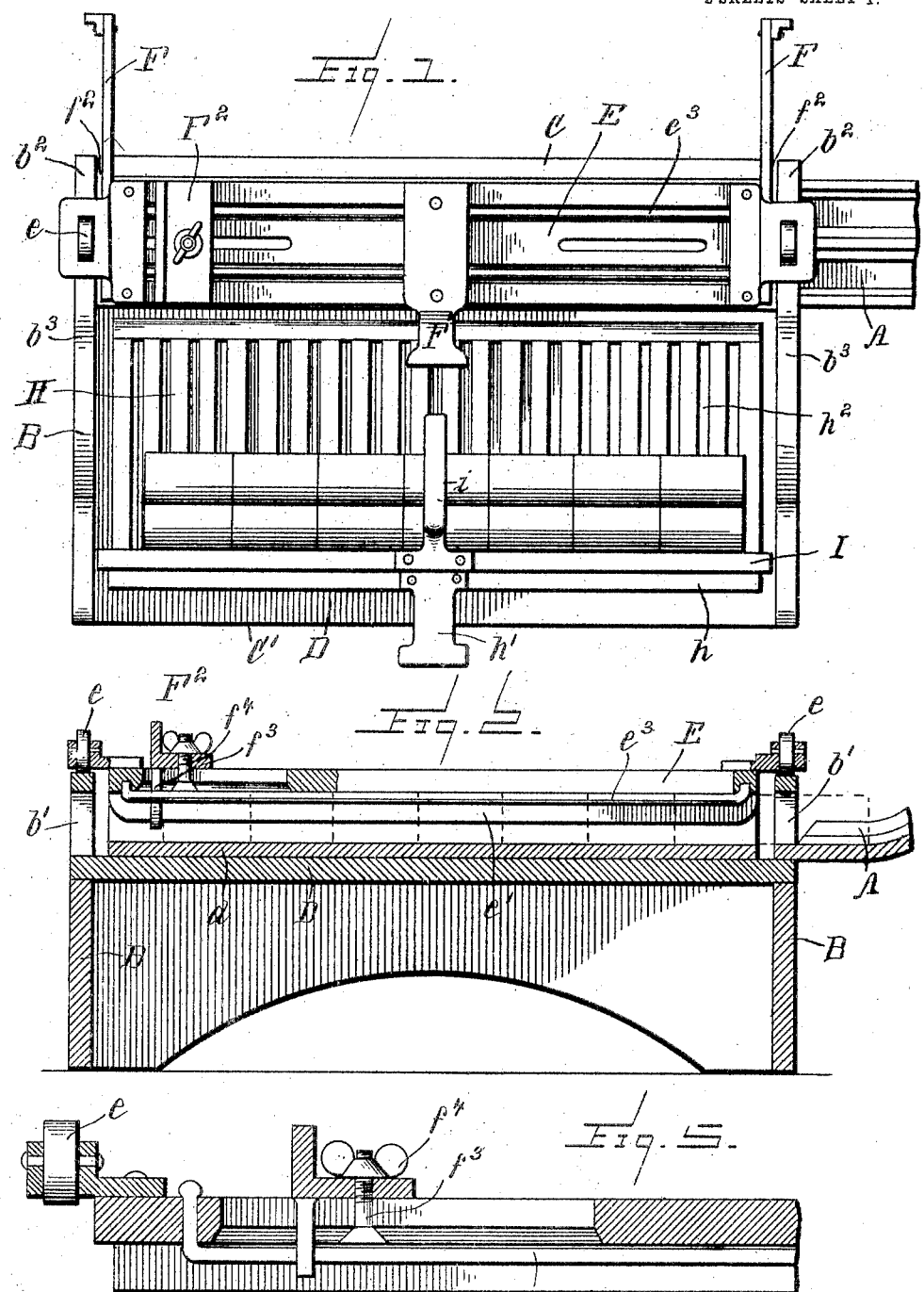

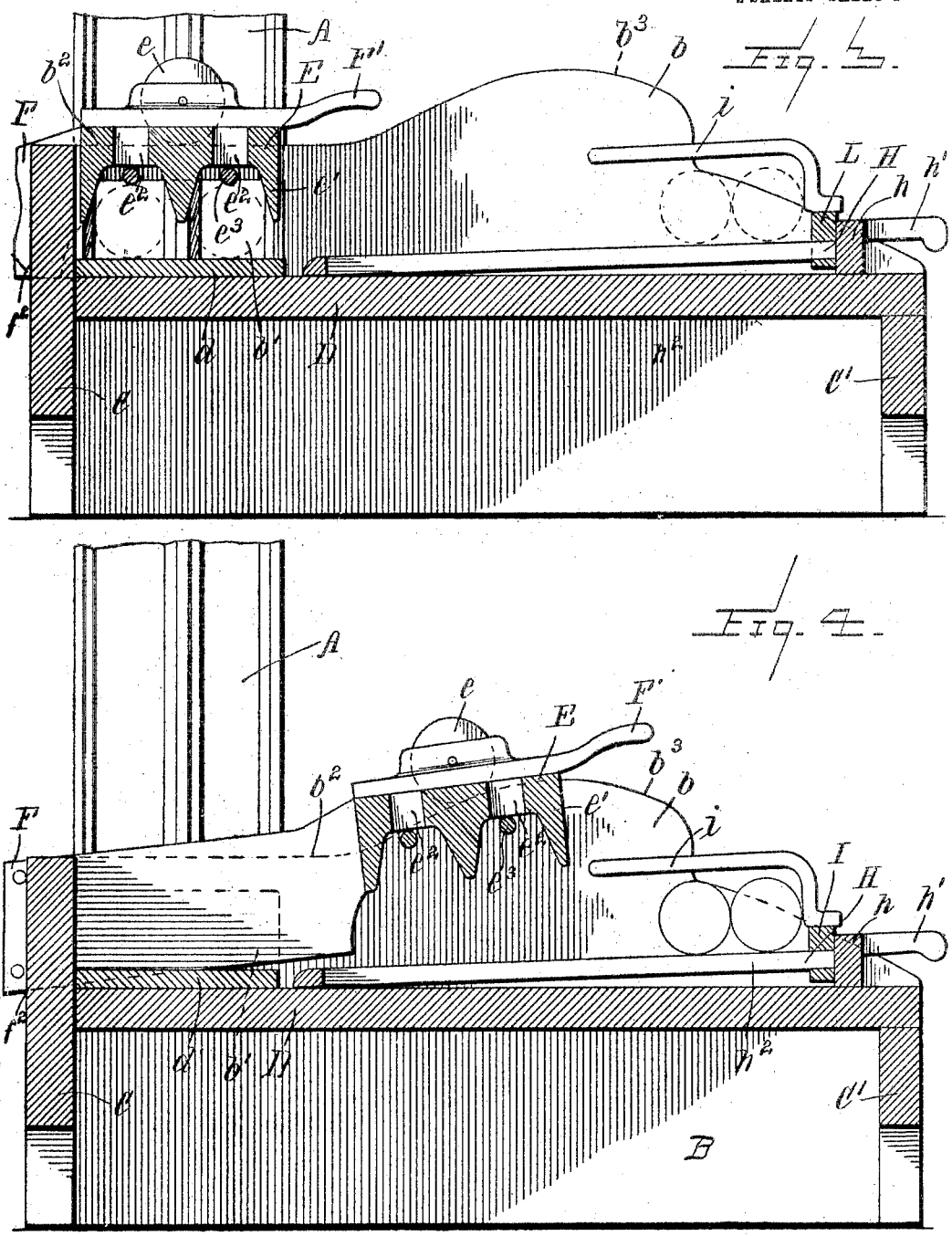

SWAN JOHNSON, OF MELROSE PARK, ILLINOIS.

APPARATUS FOR HANDLING CANS.

No. 797,359.          Specification of Letters Patent.          Patented Aug. 15, 1905.

Application filed March 27, 1905. Serial No. 252,437.

*To all whom it may concern:*

Be it known that I, SWAN JOHNSON, a citizen of the United States, residing at Melrose Park, in the county of Cook and State of Illinois, have invented new and useful Improvements in Apparatus for Handling Cans, of which the following is a specification.

This invention is an apparatus for handling cans or other packages, as in packing the same in crates, boxes, cars, and the like or in transferring the same from one place to another.

It is particularly adapted for use in can factories and in preserving or canning establishments, wherein the filled or unfilled cans have to be handled, packed, carried, or stored.

The invention comprises a table at one end of which is a chute down which the cans are fed to a position opposite a removable tray or carrier supported on the table and a movable transferring device which moves the cans from the bed of the table, where they are deposited by the chute onto the removable tray, which can then be lifted and carried to take a considerable number of cans wherever they are to be placed or packed. The tray has a slide which acts by a single motion to discharge or shove all the cans off the same. The transferring device or gatherer for loading the cans on the tray has an adjustable stop for varying the number of cans received, and also has extensions or arms which cut off the supply of cans from the chute while the transferring device is being moved.

An embodiment of the invention is illustrated in the accompanying drawings.

Figure 1 is a plan view of the machine. Fig. 2 is a vertical longitudinal section. Figs. 3 and 4 are vertical cross-sections with the parts in different positions. Fig. 5 is a detail in section, showing the adjustable stop.

Referring specifically to the drawings, A indicates a chute down which the cans are fed, as from a can-making machine, a can-filling machine, or otherwise, as the case may be. This chute delivers onto the bed $d$ at the rear of the table D, which is supported by ends B, a back C, and a front C'. The end frames project above the table, as shown at $b$, and have openings $b'$ through which the cans enter from the chute onto the shelf or bed $d$. There are openings at both ends of the table, so that the machine may be fed from either end by changing the chute around. The ends $b$ also form a track for the wheels $e$ of the reciprocating collector or transferring device E. This track has a level portion $b^2$ at the rear over the openings $b'$ and in front has an upwardly-curved or cam-shaped part $b^3$, up which the wheels of the collector run when it is drawn forward, the purpose being to disengage it from the cans which it transfers onto the tray. Other means for feeding the cans or articles may be employed, according to the nature of the articles being handled. Glass jars, paper cartons or boxes, filled packages, goods in cakes, or other merchandise may require somewhat different conveying and feeding means; but whatever means are used the articles are supplied to the table or its equivalent, which acts as a receiver on which the articles are gathered prior to their transfer to the removable tray or carrier.

The can transferrer or collector E consists of a frame mounted on the wheels $e$ and having depending longitudinal ribs $e'$. In the embodiment shown there are three of these ribs, so as to handle two rows of cans. The chute and the collector may be made to handle less or more rows of cans, as desired. The ribs $e'$ are spaced apart a proper distance to receive the cans therebetween. The end frames of the collector E are extended, as at F, to form a cut-off for the openings $b'$ when the collector is drawn forward. These extensions work through slots $f^2$ in the rear frame C. The frame E has longitudinal slots or openings $e^2$ between the flanges, in which are loosely hung leather strips $e^3$, which provide a certain amount of friction and act to guide or steer the cans straight and to prevent short or small cans from turning around as they are fed in between the ribs $e'$. The collector is also provided with a handle F', by which it may be drawn back and forth.

$F^2$ is an adjustable gage clamped upon the top of the frame E by slot and screw (indicated at $f^4$) and having depending pins $f^3$, which project through the slots $e^2$ and between the guides $e'$, so as to stop the feed of cans. This stop is adjustable to vary the number of cans or to accommodate the apparatus to cans of different sizes.

H indicates a removable tray or carrier which is supported upon the table D in front of the bed $d$. This tray has a rear strip $h$, a handle $h'$, and spaced transverse strips $h^2$, which latter support the cans when they are rolled on the tray.

I is a slide on the tray H, having openings through which the strips $h^2$ work, as shown in Figs. 3 and 4, and provided with a handle $i$ for carrying both it and the tray when the latter is removed from the table. When the cans are to be discharged or shoved off the tray, the handle is slid forward, if necessary, so that the cans can either be slid off by gravity or shoved off upwardly or on a level. The slide removes and discharges the cans uniformly and simultaneously, and consequently is of assistance in packing and storing the cans or the like. This tray or carrier, as shown, is the form particularly used for cans; but the invention is not limited to this particular form, as any suitable tray or carrying device would be useful in the relation indicated. Different sizes or kinds of articles would also necessitate change in the form of carrier used.

In operation the cans are fed down the chute A and onto the bed $d$ between the ribs $e'$. The tray being in position on the table, the collector or transferrer E is pulled forward, which slides the cans onto the tray. The forward motion causes the wheels $e$ to travel up the raised track $b^3$, which lifts the transferrer from the cans and enables the same to be pushed back in its former position for the next bunch. The extensions F cut off the supply during the motion referred to. When the tray is filled, it is lifted by the handles $h'$ and $i$ and carried to the place desired. The tray thus acts to carry uniform rows of any desired number. This is useful in counting the cans, as a count may be kept of the number of trays instead of the number of cans.

Although shown and described in connection with cans, it is obvious that the invention is capable of application for use with packages of other kinds.

What I claim as new, and desire to secure by Letters Patent, is—

1. In an apparatus for handling articles, in combination, a table, a removable tray thereon, means to feed the articles to the table, and means to transfer the same from the table to the tray.

2. In an apparatus for handling articles, in combination, a table, a removable tray thereon, means to feed the articles to the table, and a transferring device movable back and forth between the table and the tray and constructed to transfer the articles from the former to the latter.

3. In an apparatus for handling articles, in combination, a table, a removable tray thereon, a transfer-frame movable over the table and tray and having guides for the articles and means to feed the articles to the said frame.

4. In an apparatus for handling articles, in combination, a table having inclined tracks at the ends, a removable tray on the table between said ends, a transfer-frame movable upon said tracks and having depending ribs, and means to feed articles to the table under the frame, between said ribs.

5. A carrying-tray for articles having a discharging-slide secured thereto and movable back and forth thereon, substantially as described.

6. A carrying-tray for articles, comprising the bottom frame H having a handle, and the discharging-slide I secured to the frame, and having the handle $i$ extending thereover.

7. In an apparatus for handling articles, in combination, a table having a bed-piece at the rear thereof, and inclined tracks at the ends, a removable tray on the table, in front of said bed-piece and between the tracks, a transferring-frame movable back and forth on the tracks over the bed-piece and tray, and having depending ribs and means to feed the articles onto the bed-piece under said frame and between the ribs.

8. In an apparatus of the kind stated, the movable transferring-frame having depending longitudinal ribs and friction guide-strips extending between said ribs, substantially as described.

9. In an apparatus for handling articles, in combination, a table having a bed-piece at the rear thereof and inclined tracks at the ends, a feed-chute at the end of the table, delivering the articles in rows onto the bed-piece, a removable tray on the table in front of the bed-piece, and a transfer-frame movable back and forth on the tracks and having depending ribs between which the articles are received and rear extensions at the ends which close the chute when the frame is drawn forward.

10. In an apparatus of the kind stated, the movable transfer-frame having longitudinal depending ribs forming ways to receive articles, and stops on the frame between the ribs, adjustable to vary the length of the ways.

11. In an apparatus for handling packages or articles, in combination, a receiver and means to deliver articles thereto, a removable carrier supported adjacent to the receiver, means to transfer the articles from the receiver to the carrier, and means to discharge the articles from the carrier.

12. In an apparatus for handling articles, in combination, a receiver open at one side, means to deliver articles to the receiver, a removable carrier supported adjacent the open side of the receiver and having means to discharge articles therefrom, and means to simultaneously transfer the articles from the receiver to the carrier.

13. In an apparatus for handling articles, in combination, a receiver, means to deliver articles thereto in orderly arrangement, a removable carrier supported adjacent to the receiver, means to simultaneously transfer the articles from the receiver to the carrier in the same orderly arrangement, and means to discharge articles from the carrier in the same arrangement.

14. A carrying-tray for articles, comprising a frame having a handle, and a discharging-slide attached to the frame and movable back and forth thereon and having a handle extending thereover, and arranged to assist in carrying the frame.

In testimony whereof I have signed my name to this specification in the presence of two subscribing witnesses.

SWAN JOHNSON.

Witnesses:
 SIGNA FELTSKOG,
 H. G. BATCHELOR.